United States Patent
Hedman et al.

(10) Patent No.: US 9,068,637 B2
(45) Date of Patent: Jun. 30, 2015

(54) POWERSHIFT TRANSMISSION IN A MOTOR VEHICLE

(75) Inventors: Anders Hedman, Marstrand (SE); Daniel Stalberg, Eskilstuna (SE)

(73) Assignee: Volvo Lastvagnar AB, Göteborg (SE)

( * ) Notice: Subject to any disclaimer, the term of this patent is extended or adjusted under 35 U.S.C. 154(b) by 406 days.

(21) Appl. No.: 13/514,608

(22) PCT Filed: Dec. 9, 2009

(86) PCT No.: PCT/EP2009/008796
§ 371 (c)(1),
(2), (4) Date: Sep. 17, 2012

(87) PCT Pub. No.: WO2011/069526
PCT Pub. Date: Jun. 16, 2011

(65) Prior Publication Data
US 2013/0005525 A1    Jan. 3, 2013

(51) Int. Cl.
*F16H 37/06* (2006.01)
*F16H 37/04* (2006.01)
*F16H 3/00* (2006.01)
F16H 61/04 (2006.01)

(52) U.S. Cl.
CPC ......... *F16H 37/046* (2013.01); *Y10T 74/19051* (2015.01); *F16H 3/006* (2013.01); *F16H 2061/0425* (2013.01); *F16H 2061/0429* (2013.01)

(58) Field of Classification Search
None
See application file for complete search history.

(56) References Cited

U.S. PATENT DOCUMENTS

| 5,383,374 A | 1/1995 | Reynolds |
| 7,377,191 B2 * | 5/2008 | Gitt ................................ 74/330 |
| 2009/0266190 A1 | 10/2009 | Dittrich et al. |
| 2009/0272211 A1 | 11/2009 | Hoffmann et al. |

FOREIGN PATENT DOCUMENTS

| WO | 8602608 A1 | 5/1986 |
| WO | 2004030973 A1 | 4/2004 |

OTHER PUBLICATIONS

International Search Report (Apr. 20, 2010) for International application No. PCT/EP2009/008796.

* cited by examiner

*Primary Examiner* — Erin D Bishop
(74) *Attorney, Agent, or Firm* — WRB-IP LLP

(57) ABSTRACT

A powershift transmission in a motor vehicle is arranged between a prime mover and driven wheels of the motor vehicle for transmission of propulsive power and selection of different gear speed ratios. The powershift transmission includes at least two factional clutches for alternatively engaging at least two input shafts, a main transmission, a range section and an output shaft. A countershaft in the powershift transmission is rotationally connectable to the output shaft in order to establish a by-pass torque path, passing by the range section, and in which propulsive power can be transferred when the range section is gear shifted between different range speed ratios.

7 Claims, 4 Drawing Sheets

POWERSHIFT TRANSMISSION IN A MOTOR VEHICLE

BACKGROUND AND SUMMARY

The present invention relates to vehicle transmissions, especially for heavy, on-as well as off-road vehicles, and more particularly to dual clutch transmissions with a range section that can be by-passed to allow it to be shifted without interrupting the power transfer.

The conventional stepped transmission for rear-wheel drive vehicles can be regarded as a robust, compact and cost-effective product. A typical example of such a lay-out is shown in FIG. 2 in DE10242823 A1. An input shaft is coaxial with a main (output) shaft and parallel with a countershaft. A gearwheel that is rotationally fixed on the input shaft meshes with a gearwheel that is rotationally fixed on the countershaft. Several pairs of meshing gearwheels are then located side by side. In each of these pairs, one gearwheel is coaxial with the countershaft; the other is coaxial with the main shaft. One of these gearwheels is rotationally fixed on its coaxial shaft. The other gearwheel, the loose gearwheel, is free to rotate relative to its coaxial shaft, but can be rotationally locked to the shaft by a mechanical tooth clutch. This construction is used both for manually shifted transmissions as well as for automated mechanically engaged transmissions, AMTs. Because of the mechanical tooth clutches, there will during the shift be an interruption of the power transfer between the engine and the driven wheels of the vehicle. Thus, this type of transmission is not powershifting.

For heavy road vehicles, e.g., heavy trucks and buses, a large number of gears is required. Often, the conventional stepped transmission construction is extended with a splitter and a range section. The basic principle of this is shown in FIG. 1 in U.S. Pat. No. 5,351,569. With the splitter, there are two alternate ways of transferring the power from the input shaft to the countershaft. This will double the number of gears. The range section can functionally be regarded as an additional gearbox that is connected in series with the ordinary, main transmission. There are two gears therein; a low range gear with a reduction ratio in the same order of magnitude as the largest reduction ratio of the main transmission, and a high range gear where there is no change in speed from the main transmission to the output shaft of the range section. Thus, a range section also has the ability to double the number of gears of the transmission.

Hence, with a splitter and range construction of a transmission, a large number of gears, e.g., 12 or 16, can be embodied using a limited number of gearwheels. Furthermore, with a range section, large reduction ratios can easily be embodied. Such ratios are required for start-off from rest and low-speed manoeuvres of a heavy vehicle. Still, there will be power transfer interruptions at gear shifts. Most heavy vehicles have turbo-charged diesel engines that have slow dynamic response. Then, the power interruptions at gear shifts will have an unfavourable impact on the performance of the vehicle. This is especially the case at off-road driving.

Powershifting transmissions are available for heavy road vehicles. Such transmissions are, in general, based on planetary gear trains and wet multi-plate clutches, e.g., as in EP0073102A2. That makes them expensive, and they have considerable power losses. Thereby, they are not suited for vehicles of the future, where fuel consumption will be more important than ever.

Hence, a cost-efficient transmission with low power losses and no power interruptions at gear shifts would be desirable for heavy on- and off-road vehicles.

Moreover, it would be of further advantage if it could be similar in size to conventional transmissions for facilitating the installation in the vehicle chassis.

Dual clutch transmissions are an interesting cross-breed between powershifting planetary transmissions and conventional stepped transmissions with power interruption at gear shifts. In principle, a dual clutch transmission has two input shafts, each connectable with a friction clutch to the output of the engine. Functionally, this is equivalent to having two conventional transmissions in parallel, i.e., two parallel sub-transmissions, and using one at a time for power transfer. The sub-transmission that is not used, idling, for the time being, can have a gear engaged and prepared for a subsequent shift. This shift is carried out by simultaneously disengaging the friction clutch of the previously used sub-transmission and engaging the friction clutch of the previously idling sub-transmission.

When properly designed, dual clutch transmissions have a potential of providing powershifts at a reasonable production cost and low power losses. This is due to the fact that the rotating parts, i.e., gearwheels, shafts and tooth clutches, are similar to those in conventional stepped transmissions. This, furthermore, enables the use of the same production equipment. So, it makes sense to produce dual clutch transmissions in the same facilities as used for conventional stepped transmissions.

Dual clutch transmissions for rear wheel drive vehicles often have two separate countershafts, one connected to each input shaft. One example is found in U.S. Pat. No. 5,150,628. These countershafts make the transmission considerably wider than a conventional stepped transmission. That may lead to difficulties in installing the transmission into the vehicle. However, in some dual clutch transmission designs there is only one countershaft, e.g., as in DE923402 and DE3131156A1. On this countershaft there are loose gearwheels arranged that can be rotationally connected to each other and to the countershaft by means of mechanical tooth clutches. In a way, this could be regarded as if the second countershaft is arranged coaxial to the first one. The result will be a power-shiftable dual clutch transmission that is not wider than a corresponding conventional stepped transmission. The number of gears and the corresponding speed reduction ratios are insufficient for heavy severe-duty vehicles, though.

Some dual-clutch transmission concepts in a so-called winding structure have been presented, for instance U.S. Pat. No. 5,347,879, U.S. Pat. No. 5,592,854, DE10325647A1 and DE10339758 A1. In these, the power is led via four gear meshes in at least one gear, and several gearwheels are used for more than one gear. That will give further reduction of speed. However, this corresponds to just one or two additional gears. These concepts are hence less suited to heavy vehicles.

For rear wheel drive, DE102005030987A1, DE102005033027A1, DE 102006015661 A1 and EP1624232A1 show dual clutch transmissions that are connected in series with a range section. That makes them suited for heavy vehicle use. Unfortunately, there are shifts between consecutive gears where the power transfer will be interrupted in these designs.

Two further examples of a dual clutch main transmission being combined with a range section are shown in U.S. Pat. No. 4,966,048 and U.S. Pat. No. 7,204,166B2. These designs comprise two countershafts and will, due to a rear-mounted combined splitter- and range section, have several power interruptions at shifts between consecutive gears. Therefore, they are not favourable from an installation point of view, and not with respect to vehicle performance.

Two similar designs of dual clutch transmission in combination with a range section are shown in DE102005050067A1 and WO2007/039021A1. Therein, the input and output of the transmission can be connected by a friction clutch. This friction clutch can transfer power when a gear shift takes place. Thereby, power interruption can be avoided at all gear shifts. However, for reasonable sizes of this friction clutch, the power transferred to the driven wheels is very small at shifts between low gears. At the same time, the power dissipated in this friction clutch is large at these gear shifts. Thus, these types of dual clutch transmission would have a limited practical use, especially for on- and off-road vehicles.

The dual-clutch transmissions in DE923402 and DE3131156A1 could be combined with a range section. That would give a compact transmission with several gears and high reduction ratios. Gear-shifts between consecutive gears would be without power interruption except when the range section is shifted. This would probably be acceptable on most heavy on-road vehicles, but not for, e.g., trucks in hilly applications or articulated haulers.

U.S. Pat. No. 7,353,724B2 shows in FIGS. 1 and 3 dual-clutch transmissions where a direct connection between one of the input shafts and the output shaft can transmit power when changing between low, underdrive, gears and high, overdrive, gears. This is not a true range section, though. The number of gears is doubled, but in the low, underdrive, gears the power is transmitted via two gear meshes, only, as in FIG. 2 in U.S. Pat. No. 6,958,028B2. That limits the practically possible speed reduction. Thereby, these transmissions are not well suited to heavy vehicles.

A somewhat similar principle is disclosed in U.S. Pat. No. 4,777,837. There, separate gearwheel pairs are provided for intermediate gears between the low and high range gears. This will give a large number of gears and no power interruptions at gear-shifts between consecutive gears. In low range gears, the power is transmitted via three gear meshes, which will enable large reduction ratios. However, the transmission is bulky due to two parallel countershafts. Moreover, the output shaft is not coaxial with the input shaft. That makes the transmission incompatible with most heavy truck designs. The number of components is large, adding costs.

Further on, U.S. Pat. No. 7,070,534B2 presents a dual clutch transmission 10 with a planetary range section 56 and coaxial input 86 and output 68. A dual clutch unit 20, 22 selectively transfers power to input shafts 90 and 92. To each of these input shafts 90 and 92 a countershaft, 74 and 76, respectively, is arranged. From each of these countershafts 74, 76 the power can be selectively directed with tooth clutches 80 and 84 to the output 68 in either of two ways. Firstly, the power can be led to the sun gear 58 of the planetary range section 56 via gearwheels 44, 46 and 54, 46, respectively. That will give a speed reduction in the planetary range section 56, thus corresponding to low range gears. Secondly, the power can be led more directly to the output 68 via gearwheels 40, 42 and 50, 42, respectively. The planetary range section will then be idling, and high range gears are established. Shifts without power interruption can be carried out between low and high range gears. Unfortunately, the number of rotating components, e.g., gearwheels and tooth clutches, is relatively large in comparison with the number of gears. The large number of gearwheels makes the transmission long, and the two parallel countershafts make it wide and difficult to fit in the vehicle. Furthermore, the idling planetary range section will imply unnecessarily large power losses in high range gears.

U.S. Pat. No. 6,958,028B2, FIG. 5, shows a dual clutch transmission with a planetary range section. This transmission is similar to the one in U.S. Pat. No. 7,070,534B2. The main difference is that both input shafts, 30 and 40, use the same countershaft 50, tooth clutch 130, and gearwheels 122, 132 and 132, 128 between this countershaft and the planetary range section. Power interruption between low and high range gears is eliminated by a bridge torque path via a separate countershaft 152. That makes the transmission wide, and it shares the rest of the disadvantages of the one in U.S. Pat. No. 7,070,534B2; many components, long, and high power losses for high range gears.

FIG. 1 in US2008/0188342A1 shows a dual clutch transmission with one countershaft and a planetary range section. A bridge torque path is formed by a tooth clutch 84 that rotationally locks a loose gearwheel 64 on main shaft 28 to a planet carrier 68 rotationally fixed to output shaft 70. When power is led in this path, the gearwheels in the planetary range section are idling, and the range section can be shifted between high and low positions. This gives a narrow transmission with high reduction ratios where power interruptions can be avoided at every shift between consecutive gears. Unfortunately, this bridge path embodiment has many drawbacks. Firstly, the tooth clutch 84 is of complex design, making it costly and long. Secondly, the bearing 32 that carries main shaft 28 must be located in front of loose gearwheel 64. This puts a large part of main shaft 28 behind bearing 32, which, in turn, increases the misalignments in the range section and tooth clutch 84. Moreover, the assembly of the transmission is not facilitated by a main shaft having loose gearwheels and tooth clutches on both sides of the housing wall that carries bearing 32. Thirdly, the addition of parts for the tooth clutch 84 will make the already complex shape of planet carrier 68 even more complex and difficult to produce. DE102007047671A1 shows a similar design that has similar disadvantages.

It is desirable to present an alternative powershift transmission arrangement where the drawbacks of above mentioned prior art are eliminated.

It is desirable to present an improved powershift transmission.

The device according to an aspect of the invention is a powershift transmission in a motor vehicle, where said powershift transmission is arranged between a prime mover and driven wheels of said motor vehicle for transmission of propulsive power and selection of different gear speed ratios, where said powershift transmission comprising at least two frictional clutches for alternatively engaging at least two input shafts, a main transmission, a range section and an output shaft, said main transmission comprising said input shafts, a main shaft and a countershaft, that is parallel to said main shaft, and where said countershaft carries a number of gearwheels that are in mesh with gearwheels that are carried by said main shaft or said at least two input shafts, and where said main shaft is arranged as an output member of said main transmission and integral with or rotationally fixed to an input member of said range section, and where an output member arranged in said range section is integral with or rotationally fixed to said output shaft, and where said range section is arranged with at least two alternating torque paths with different range speed ratios that can be established by selective engagement and disengagement of at least one range clutch, characterized in that said countershaft is rotationally connectable to said output shaft in order to establish a by-pass torque path, passing by said range section without putting any load on any of the parts in said range section, and in which propulsive power can be transferred when said range section is gear shifted between said different range speed ratios.

The benefit with the device is that for heavy, on- and off-road vehicles the invention provides a transmission that i) enables high power transfer to the driven wheels during all shifts between consecutive gears, ii) can provide high reduction ratios, iii) is cost-effective and simple to produce, iv) has low power losses and v) can be easily installed in a vehicle as an alternative to conventional stepped transmissions.

In another embodiment according to the invention in said by-passing torque path the propulsive power is led between a by-passing gearwheel, which is coaxial with and rotationally connectable to said countershaft, and a by-passing output gearwheel, which is coaxial with and rotationally connectable to said output shaft.

In a further embodiment according to the invention said by-passing gearwheel and said by-passing output gearwheel are in mesh.

In another embodiment according to the invention said by-passing gearwheel is arranged on a by-passing shaft that is integral with or rotationally fixed to said countershaft.

In another embodiment according to the invention said by-passing gearwheel is a loose gearwheel that can be selectively rotationally locked to said by-passing shaft by a by-passing clutch.

In a further embodiment according to the invention said by-passing output gearwheel is a loose gearwheel that can be selectively rotationally locked to said output shaft by a by-passing clutch.

In another embodiment according to the invention said by-passing shaft is arranged to drive a power take-off unit.

In a further embodiment according to the invention said by-passing output gearwheel is located at the same axial position behind said range section as an optional retarder drive gearwheel that can drive an optional retarder auxiliary brake.

In another embodiment according to the invention said by-passing output gearwheel is arranged to drive a retarder.

In a further embodiment according to the invention said by-passing clutch in engaged state rotationally locks said countershaft with said by-passing gearwheel or a by-passing shaft that is integral with or rotationally fixed to said by-passing gearwheel.

In another embodiment according to the invention said range section is of planetary gear design.

In a further embodiment according to the invention said planetary range section comprising a planet carrier that is integral with or rotationally fixed to said output shaft.

BRIEF DESCRIPTION OF THE DRAWINGS

The present invention will be described in greater detail below with reference to the accompanying drawings which, for the purpose of exemplification, shows further preferred embodiments of the invention and also the technical background, and in which.

DETAILED DESCRIPTION

Figure 1:
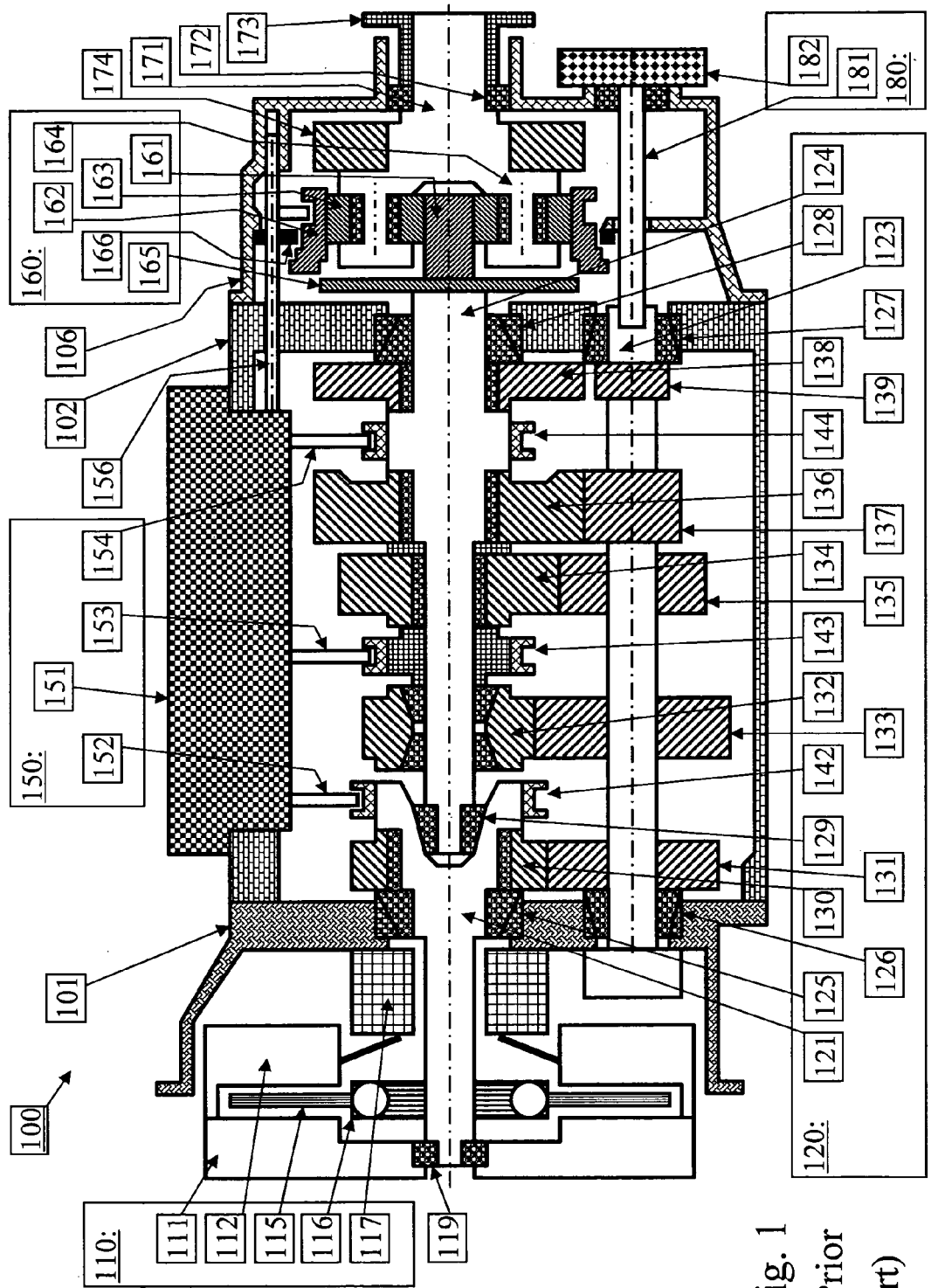
FIG. 1 schematically shows a stepped automatic mechanically engaged transmission (AMT) according to known art.

FIG. 1 shows schematically a longitudinal section of a stepped automatic mechanically engaged transmission (AMT) 100 according to known art for a heavy road vehicle. The transmission 100 comprises three housing parts; a clutch housing 101, a main housing 102 and a range housing 106. In the clutch housing 101 a frictional clutch 110 is arranged, comprising a flywheel 111, a clutch assembly 112 bolted thereon, a clutch disc 115 with torsional damper 116 and a clutch actuator 117. The flywheel 111 is attached to the engine crankshaft (not shown).

A main transmission 120 is arranged inside the main housing 102. There are three shafts in the main transmission 120; an input shaft 121, a countershaft 123 and a main shaft 124. The input shaft 121 and the main shaft 124 are coaxial, and the countershaft 123 is arranged parallel to them. The input shaft 121 is suspended in the clutch housing 101 by an input shaft bearing 125 and in the flywheel 111 by a flywheel pilot bearing 119. The countershaft 123 is suspended in the housings 101 and 102 by a front countershaft bearing 126 and a rear countershaft bearing 127, respectively. The main shaft 124 is suspended in the main housing 102 by a main shaft bearing 128 and in the input shaft 121 by a main pilot bearing 129.

On the input shaft 121 and the main shaft 124 a number of rotatable, loose gearwheels are arranged. Each of these loose gearwheels is in mesh with a gearwheel that is either fixed on or integral with the countershaft 123. On the input shaft 121 there is a second primary loose gearwheel 130 that meshes with a second primary gearwheel 131 on the countershaft 123. To the right of the input shaft 121 in FIG. 1, a first primary loose gearwheel 132 is arranged on the main shaft 124. The first primary loose gearwheel 132 meshes with a first primary gearwheel 133 on the countershaft 123. Further to the right in FIG. 1 a second secondary loose gearwheel 134 on the main shaft 124 is in mesh with a second secondary gearwheel 135 that is fixedly attached to the countershaft 123. Next, a first secondary loose gearwheel 136 On the main shaft 124 is meshing with a first secondary gearwheel 137 that is integral with the countershaft 123. Finally, a reverse secondary loose gearwheel 138 is arranged on the main shaft 124 close to the main shaft bearing 128. The reverse secondary loose gearwheel 138 is via a reverse idler gearwheel (not shown) drivingly connected with a reverse secondary gearwheel 139 that is integral with the countershaft 123.

A splitter tooth clutch 142 can rotationally lock the input shaft 121 to either the second primary loose gearwheel 130 or the first primary loose gearwheel 132. That gives two alternate power transfer paths between the input shaft 121 and the countershaft 123. Two tooth clutches are used for transferring power between the countershaft 123 and the main shaft 124. A second/third tooth clutch 143 can rotationally lock the main shaft 124 to either the first primary loose gearwheel 132 or the second secondary loose gearwheel 134. A first/reverse tooth clutch 144 can rotationally lock either the first secondary loose gearwheel 136 or the reverse secondary loose gearwheel 138 to the main shaft 124. Thereby, four alternate ways for power transfer between the countershaft 123 and the main shaft 124 are provided.

Inside the range housing 106, a planetary range section 160 is arranged, comprising a sun gear 161, an internally cogged ring gear 162, a plurality of planet gears 163 on a planet carrier 164, a high range engaging ring 165, and a low range clutch ring 166. The sun gear 161 and high range engaging ring 165 are rotationally fixed to or integral with the main shaft 124. The planet gears 163 mesh with ring gear 162 and sun gear 161. An output shaft 171 is rotationally fixed to or integral with planet carrier 164, carried by an output shaft bearing 172, and rotationally fixed to an output companion flange 173 and an optional retarder drive gearwheel 174 that is in mesh with a gearwheel of a not shown optional retarder auxiliary brake.

By displacement to the left in FIG. 1, the ring gear 162 can be rotationally locked to the high range engaging ring 165, main shaft 124 and sun gear 161. Then, the planet gears 163 will be fixed between the ring gear 162 and sun gear 161. That will give the same rotational speed for the main shaft 124 and output shaft 171, yielding a high range gear. On the other hand, by displacing the ring gear 162 to the right in FIG. 1, it can be rotationally locked to a low range clutch ring 166 that is fixed to the range housing 106. The ring gear 162 will not rotate, causing the output shaft 171 to rotate slower than the main shaft 124, hence a low range gear. Thus, said ring gear together with said range engaging ring and said low range clutch ring respectively work as a range clutch. Further, said low range gear and said high range gear can be defined as range speed ratios.

The automatic or semi-automatic gear shift is carried out by a gear-shift control unit 150. This gear-shift control unit 150 comprises a gear-shift control housing 151, a splitter shift fork 152, a second/third shift fork 153 and a first/reverse shift fork 154. The splitter shift fork 152 controls the splitter tooth clutch 142. The second/third shift fork 153 controls the second/third tooth clutch 143, and the first/reverse shift fork 154 controls the first reverse tooth clutch 144. A range shift rod and fork 156 that controls the displacement of the ring gear 162 is connectable to, but not part of, the gear-shift control unit 150. Other configurations are possible; any of the shift forks 152, 153 and 154 may or may not be a part of the gear-shift control unit 150. Furthermore, the gearshift control unit 150 may be composed of different parts that are arranged at different locations of the transmission 100.

The design of the gear-shift control unit 150 will not be described in detail here. Its structural part, the gear-shift control housing 151, may be machined from a cast blank and it is bolted to the main housing 102. Therein, microcontrollers, sensors, valves, and actuators may be found. The shift forks 152, 153 and 154 may be carried by shift rods that connect to actuators.

An optional power take-off drive device 180 is located in the lower part of the range housing 106. Therein, a power take-off drive shaft 181 is rotationally fixed to or integral with the countershaft 123. The power take-off drive shaft 181 drives a power take-off unit 182 that is bolted to the range housing 106; it may also drive a transmission oil pump (not shown). The power take-off unit 182 is not shown in detail, but may comprise housing parts, bearings, shafts, clutches and control parts for engagement and disengagement, gearings for speed adaption, and output flanges, as is readily known by a person skilled in the art.

Figure 2:
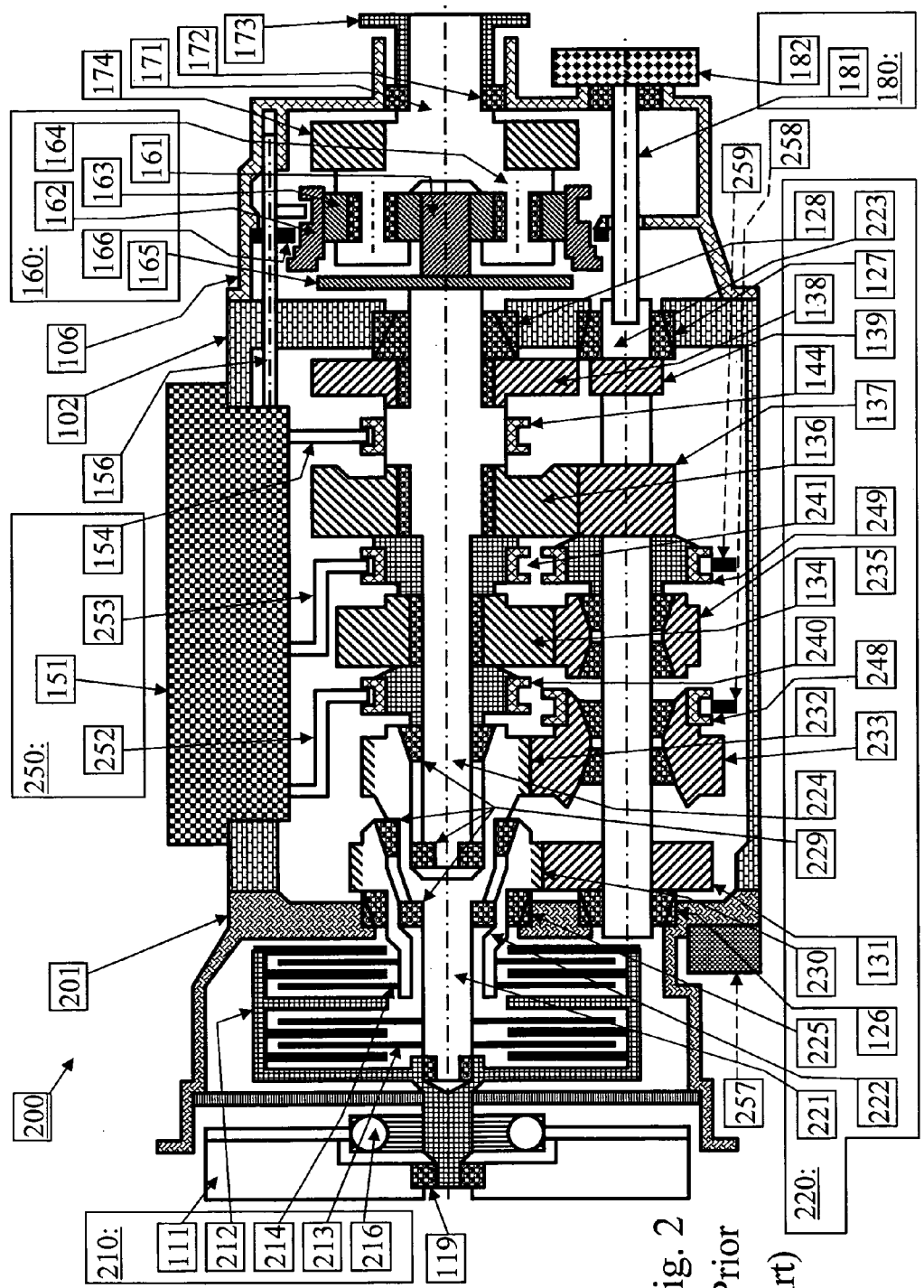
FIG. 2 schematically shows a stepped automatic mechanically engaged dual clutch transmission (DCT) according to known art.

Due to the single clutch 110 and the tooth clutches 142, 143 and 144, there will be a power interruption at every gear shift in the transmission 100. By using a dual clutch unit and two input shafts, these power interruptions can be eliminated to a far extent. Then, the transmission 100 would be converted to a dual clutch transmission with a range section 160. FIG. 2 shows this schematically. In a modified clutch housing 201, a multiple clutch or a dual frictional clutch 210 is arranged. The dual frictional clutch 210 comprises the flywheel 111, a torsional damper 216 bolted thereon, and a dual clutch assembly 212 with a first clutch disc set 213 and a second clutch disc set 214. There is also an actuator device (not shown) to control the dual frictional clutch 210.

A main transmission 220 is arranged inside the main housing 102. There are two input shafts; a first input shaft 221 and a second input shaft 222. The first input shaft 221 can be rotationally driven by the first clutch disc set 213. Similarly, the second input shaft 222 can be rotationally driven by the second clutch disc set 214. Hence, the dual frictional clutch 210 and the input shafts 221 and 222 will in a way replace the splitter tooth clutch 142 in FIG. 1.

First primary gear teeth 232 are rotationally fixed to or integral with the first input shaft 221. Second primary gear teeth 230 are rotationally fixed to or integral with the second input shaft 222. A modified main shaft 224 is coaxial with the input shafts 221 and 222. A modified countershaft 223 is parallel thereto. The second input shaft 222 is suspended in the clutch housing 201 by an input shaft bearing 225. Between the main shaft 224, the first input shaft 221 and the second input shaft 222, four pilot bearings 229 are arranged. Thereby, a thorough but not over-constrained suspension of the main and input shaft is achieved.

The main shaft 224 carries three loose gearwheels; the second secondary loose gearwheel 134, the first secondary loose gearwheel 136 and the reverse secondary loose gearwheel 138. Here, the first and reverse secondary loose gearwheels 136 and 138 can be rotationally locked to the main shaft by the first/reverse tooth clutch 144, exactly as in the transmission 100 in FIG. 1. The second secondary loose gearwheel 134 can be rotationally locked to the main shaft 224 by a second tooth clutch 241. Moreover, the main shaft 224 can be rotationally locked to the first input shaft 221 by a direct tooth clutch 240.

On the countershaft 223, the second primary gearwheel 131 meshes with the second primary gear teeth 230 of the second input shaft 222. A primary countershaft loose gearwheel 233 meshes with the first primary gear teeth 232 of the first input shaft 221. A secondary countershaft loose gearwheel 235 meshes with the second secondary loose gearwheel 134 on the main shaft 224. Finally, the first secondary gearwheel 137 and the reverse secondary gearwheel 139 function as in the transmission 100 in FIG. 1.

The primary countershaft loose gearwheel 233 and the secondary countershaft loose gearwheel 235 can be rotationally locked by a first countershaft tooth clutch 248. The secondary countershaft loose gearwheel 235 can be rotationally locked to the countershaft 223 by a second countershaft tooth clutch 249. The countershaft tooth clutches 248 and 249 are controlled by a first countershaft shift fork 258 and a second countershaft shift fork 259. The shift forks 258 and 259 are actuated via shift rods (not shown) by a countershaft actuator 257.

The main shaft tooth clutches, 240, 241 and 144, are controlled by a gear-shift control unit 250 with shift forks 252, 253 and 154. The direct shift fork 252 and the second shift fork 253 are new compared to the gear-shift control unit 150 in FIG. 1. There may be further differences with respect to sensors, electronics and software, etc., between the gear-shift control units 150 and 250. However, with the countershaft actuator 257, the gear-shift control housing 151, or at least its blank, can be common for both gear-shift control units 150 and 250.

The shift rods that connect the countershaft shift forks 258 and 259 with the countershaft actuator 257 may require some suspension device in the main housing 102. In such a case, modifications would be required on the main housing 102. It would still, however, be possible to use the same main housing in the conventional transmission 100 as in the dual clutch transmission 200. In order to save costs even further, it may be of advantage to use the same (cast) blank for the main housing, but do the additional machining for the said suspension device for the dual clutch transmission 200, only.

Several parts in FIG. 2 are, or could be, identical to the corresponding parts in FIG. 1. Those parts are referred to by the same numbers as in FIG. 1, by the initial digit 1.

The main transmission 220 is functionally identical or very similar to dual clutch transmissions in DE923402 and DE3131156A1. It has six forward gears where high power transfer to the driven wheels is enabled during shifts between consecutive gears. The combination with range section 160 increases the number of gears and the maximum reduction ratio of the complete transmission 200, although with power interruption when range section 160 is shifted.

So, it would be of advantage if the transmission 200 could be modified to eliminate the range shift power interruption. Preferably, such a modification should imply a minimum impact on the advantageous features of the transmission 200 in terms of size, cost, power losses and similarities with the conventional AMT 100. There are interesting solutions in U.S. Pat. No. 6,958,028B2 (FIG. 5) and U.S. Pat. No. 7,070,534B2, with low and high range power paths in the main transmission. However, that would result in a longer and wider transmission or a lower number of gears. The design in US2008/0188342A1 would be better, however still requiring significant axial space. Moreover, the forward position of the rear main shaft bearing will, as discussed earlier, have a negative impact at the assembly and on misalignments in operation.

Figure 3:
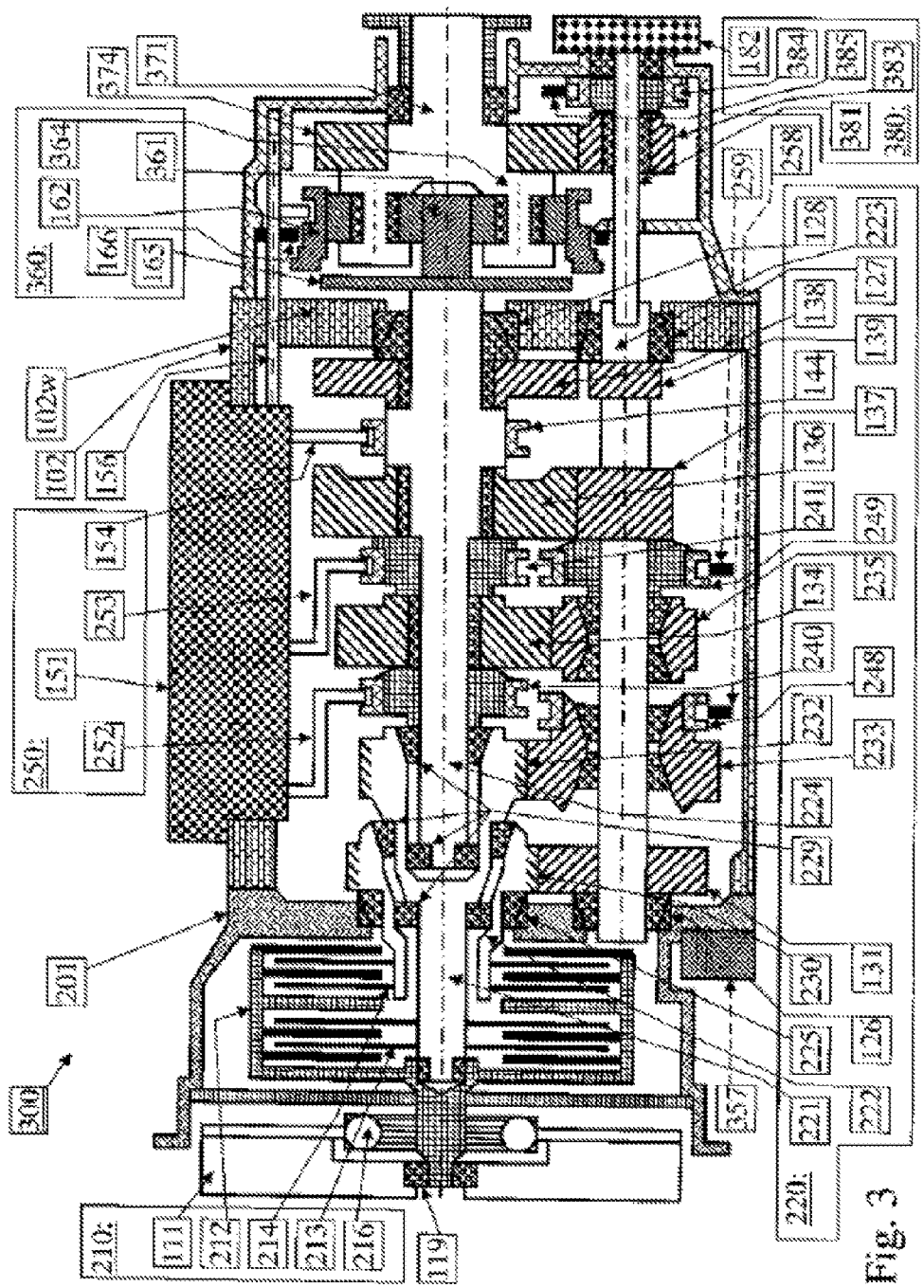
FIGS. 3 and 4 schematically shows a stepped automatic mechanically engaged dual clutch transmission (DCT) according to two embodiments of the invention.

A modified dual clutch transmission 300 according to the invention is shown in FIG. 3. There, a rotatable, loose by-passing gearwheel 383 and a by-passing tooth clutch 384 are added to a modified power take-off device 380. The by-passing gearwheel 383 meshes with a modified retarder drive gearwheel 374 that is rotationally fixed to a modified output shaft 371. The by-passing tooth clutch 384 can selectively rotationally lock the by-passing gearwheel 383 to a modified by-passing power takeoff drive shaft 381. A modified countershaft actuator 357 controls the by-passing tooth clutch 383 via a shift rod (not shown) and a by-passing shift fork 385.

Then, a by-passing power path can be established from the countershaft 223 to the output shaft 371 via the power take-off drive shaft 381, by-passing tooth clutch 234, by-passing gearwheel 383 and retarder drive gearwheel 374. Thereby, the range section 360 will not be subjected to any torque load, neither on the gear teeth nor on the planet carrier 364. It can then be shifted between low and high range positions while power is transferred to the driven wheels, hence eliminating the power interruption. Moreover, the planet carrier design is not more complex.

With the by-passing power path on the rear, down-stream side of the range section 360, no modifications are required in the main transmission 220. Thus, the main housing 102 can be identical in transmissions 200 and 300. This also holds for the external dimensions; since the range section 160 is prepared for an optional auxiliary brake, retarder, the length, from the clutch housing 201 to the companion flange 173 is the same for these transmissions. That facilitates the installation in the vehicle chassis.

Thus, the result is a transmission with several forward gears that can have; i) gear-shifting between consecutive gears without power interruption, and ii) high reduction ratio. With similar range section 360 as the conventional transmission 100, and similar construction with gearwheels and tooth clutches in the main transmission 220, iii) cost advantages will result. The use of just a dual frictional clutch, and tooth clutches for the rest, will result in iv) low power losses, similar to those of the conventional transmission 100. Furthermore, the use of one countershaft (223), only, will make the dual clutch transmission 300 just as narrow and v) easy to install in the vehicle as the conventional transmission 100.

Figure 4:
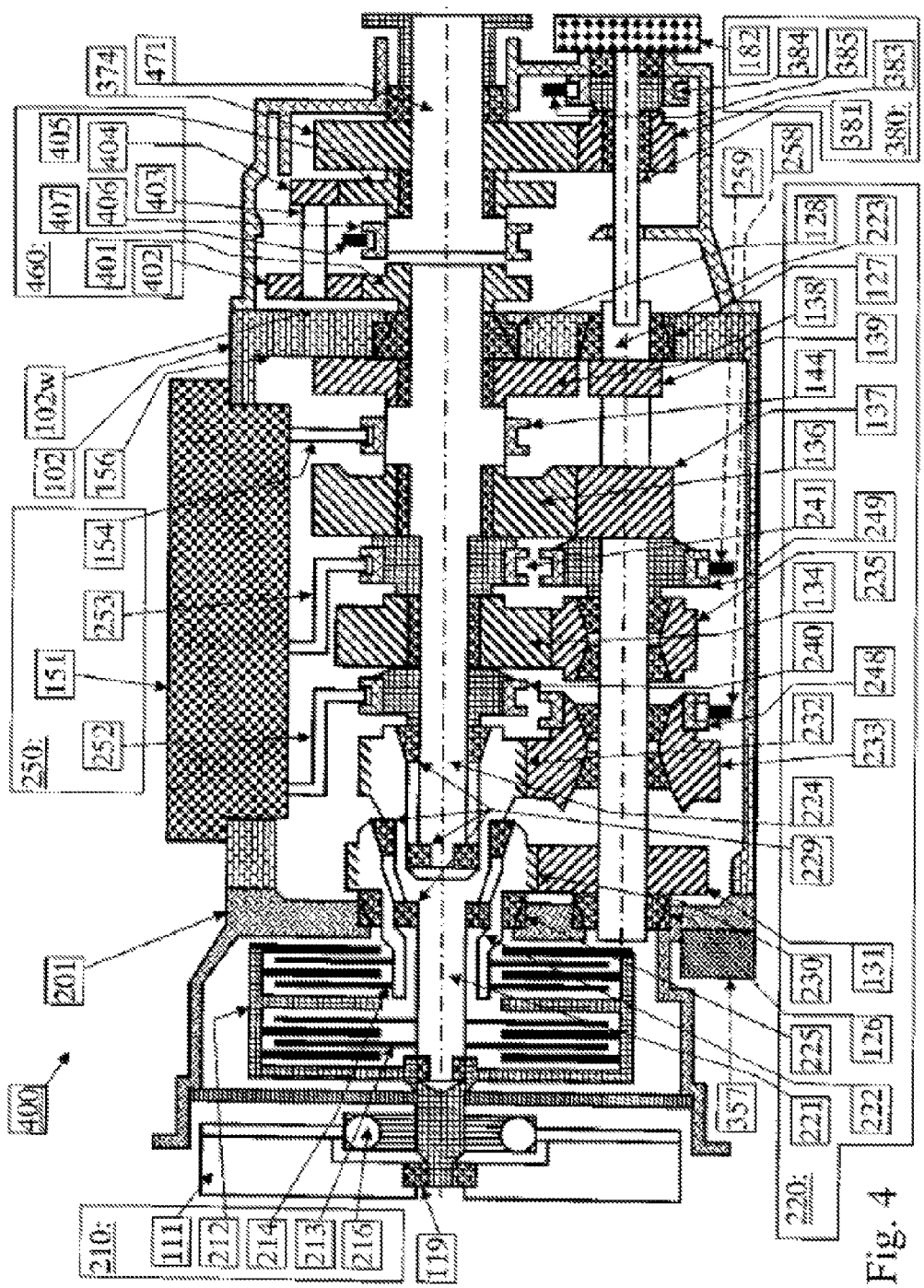

Non-planetary range sections as in U.S. Pat. No. 4,966,048 or U.S. Pat. No. 7,204,166B2 would be possible, as well as designs with in- and output shafts parallel, non-Coaxial, e.g., EP1624232A1 and U.S. Pat. No. 4,777,837. FIG. 4 discloses an embodiment of the invention where a non-planetary two-speed range is used in a dual clutch transmission 400 and where in- and output shafts are coaxial (as in FIG. 3). The embodiment of FIG. 4 differs from the embodiment disclosed in FIG. 3 only in the design of the range gear section. The modified power take-off device 380 can stay intact.

The non-planetary range section 460 comprises a first range gearwheel 401 rotationally fixed to the output end of the main shaft 224. Said first range gearwheel is in mesh with a second range gearwheel 402 rotationally fixed to a range gear shaft 403 arranged in parallel to said main shaft and output shaft 471. A third range gearwheel 404 is also arranged rotationally fixed to said range gear shaft. Said third range gearwheel is in mesh with a rotatable loose fourth range gearwheel 405 arranged on the output shaft 471. Said fourth range gearwheel can selectively be rotationally fixed to said output shaft by a range tooth clutch 406, which in FIG. 4 will be displaced to the right. When the fourth range gear wheel is rotationally fixed to the output shaft and the main shaft not engaged with the output shaft a low range gear ratio is achieved via said first to fourth range gear wheels. The range tooth clutch is also arranged to selectively connect the output end of said main shaft to said output shaft thereby engaging a 1:1 (high) range gear ratio. A modified range shaft actuator (not shown) controls the range tooth clutch 406 via a shift rod (not shown) and a range shift fork 407.

Hence, the dual clutch transmissions 300 and 400 can potentially fulfill the full scope of the invention. Variations from FIG. 3 or 4 are possible without departing from the scope of the invention:

In another embodiment of the invention, the retarder drive gearwheel 374 is used for driving the optional retarder as well as for the by-passing power path.

In a further embodiment of the invention, the by-passing power take-off drive shaft 381 is used for driving the optional power take-off unit 182 as well as for the bypassing power path.

In yet another embodiment of the invention, the by-passing shift fork 385 is controlled by the same actuator as a shift fork in the main transmission 220. Furthermore, these two shift forks may be carried by the same shift rod.

In an alternative embodiment of the invention, the by-passing tooth clutch 384 is substituted by a tooth clutch between the output shaft 371 and retarder drive gearwheel 374 (which has to be rotatably arranged on the output shaft 371). Then, a conventional retarder option is no longer feasible. The elimination of power interruptions makes an efficient engine brake an adequate substitute.

In further embodiments of the invention, the by-passing tooth clutch 384 is located on the other side of the by-passing gearwheel 383. It could also (if the power take-off function is relocated) be located close the main housing wall 102w and selectively connect a modified end of the countershaft (223) with a combined power take-off drive shaft (381) and by-passing gearwheel (383).

In another embodiment of the invention, the power take-off drive shaft 381 is substituted by, or integrated with, an elongated variant of the countershaft 223.

The rotating parts in the main transmission 220 and range section 360 or 460 may be modified in order to yield speed ratios and number of gears that better suit the fully power-shifting transmission 300 or 400.

Other arrangements and locations of the friction clutches 210 would also be possible, e.g., as in U.S. Pat. No. 5,347,879 or U.S. Pat. No. 4,777,837.

Moreover, designs with three friction clutches, "triple clutch transmissions", or more, e.g., DE4226577C1 or US2008/0190228A1, could also be included. Power-shifting transmissions having more than one friction clutch can be referred to as multi-clutch transmissions.

The tooth clutches 240, 241, 144, 248, 249 and 162,165, 166 may or may not be equipped with synchronizing parts in order to facilitate engagement, as is readily known by a person skilled in the art. A central synchronizing device would also be possible, e.g. as 30 in U.S. Pat. No. 5,150,628.

The invention should not be deemed to be limited to the embodiments described above, but rather a number of further variants and modifications are conceivable within the scope of the following patent claims.

Below follows further suggested solutions which lies outside the scope of the above described invention:

With another design of the range section 360, e.g., as in U.S. Pat. No. 5,351,569 or DE102005030987A1, the by-passing gearwheel 383 and retarder drive gearwheel 374 could be located between the main housing wall 102w and planetary gear train 161, 162, 163. That would increase the complexity of the planet carrier.

The invention claimed is:

1. A powershift transmission for a motor vehicle, wherein the powershift transmission is arranged between a prime mover and driven wheels of the motor vehicle, the powershift transmission being arranged for transmission of propulsive power and selection of different gear speed ratios, the powershift transmission comprising
    at least two frictional clutches for alternatively engaging at least two input shafts,
    a main transmission,
    a range section and an output shaft,
    the main transmission comprising the input shafts, a main shaft and a countershaft, the countershaft being parallel to the main shaft, and the countershaft carrying a plurality of gearwheels that are in mesh with gearwheels that are carried by one of the main shaft and the at least two input shafts, and
    the main shaft being arranged as an output member of the main transmission and being integral with or rotationally fixed to an input member of the range section,
    wherein an output member arranged in the range section is integral with or rotationally fixed to the output shaft, and
    wherein the range section is arranged with at least two alternating torque paths with different range speed ratios that can be established by selective engagement and disengagement of at least one range clutch, and
    wherein the countershaft is rotationally connectable to the output shaft in order to establish a by-pass torque path through which torque passes the range section without putting any load on any parts in the range section, and
    wherein propulsive power can be transmitted via the powershift transmission when the range section is gear shifted between the different range speed ratios, and
    wherein in the by-pass torque path, propulsive power is transmitted between a bypassing gearwheel, which bypassing gearwheel is coaxial with the countershaft, and a bypassing output gearwheel, which bypassing output gearwheel is coaxial with the output shaft,
    wherein the bypassing gearwheel is arranged on a bypassing shaft that is integral with or rotationally fixed to the countershaft, wherein the bypassing gearwheel is a loose gearwheel that can be selectively rotationally locked to the bypassing shaft by a bypassing clutch, wherein the bypassing output gearwheel is rotationally fixed to the output shaft.

2. The powershift transmission as in claim 1, wherein the bypassing gearwheel and the bypassing output gearwheel are in mesh with each other.

3. The powershift transmission as in claim 2, wherein the bypassing shaft is arranged to drive a power take-off unit.

4. A The powershift transmission as in claim 2, wherein the bypassing output gearwheel is located at a same axial position behind the range section as an optional retarder drive gearwheel.

5. The powershift transmission according to claim 1, wherein the bypassing clutch in an engaged state rotationally locks the bypassing shaft with the bypassing gearwheel.

6. The powershift transmission as in claim 1, wherein the range section is of planetary gear design.

7. The powershift transmission as in claim 6, wherein the planetary range section comprises a planet carrier that is integral with or rotationally fixed to the output shaft.

* * * * *